Figure 1A:
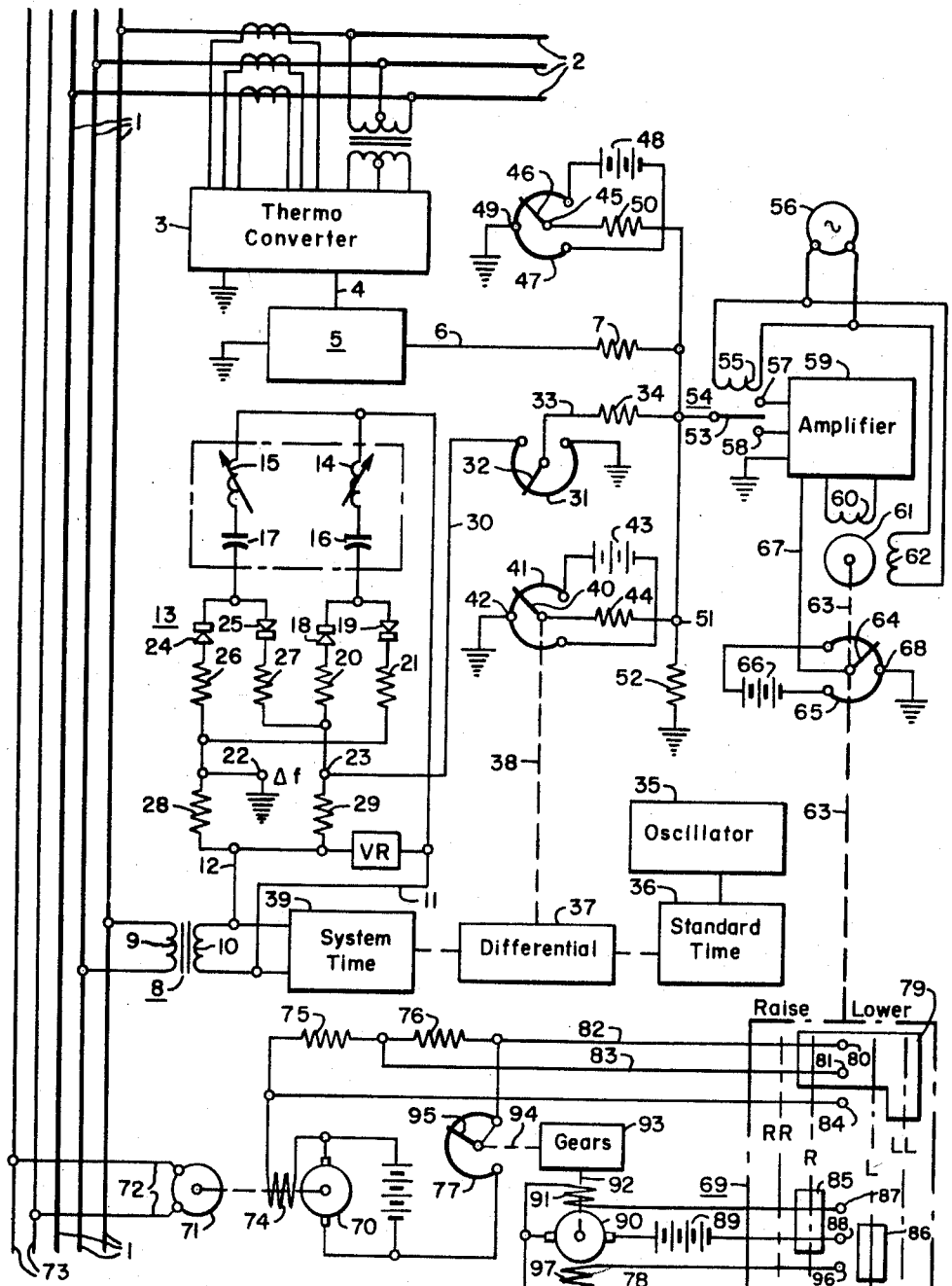

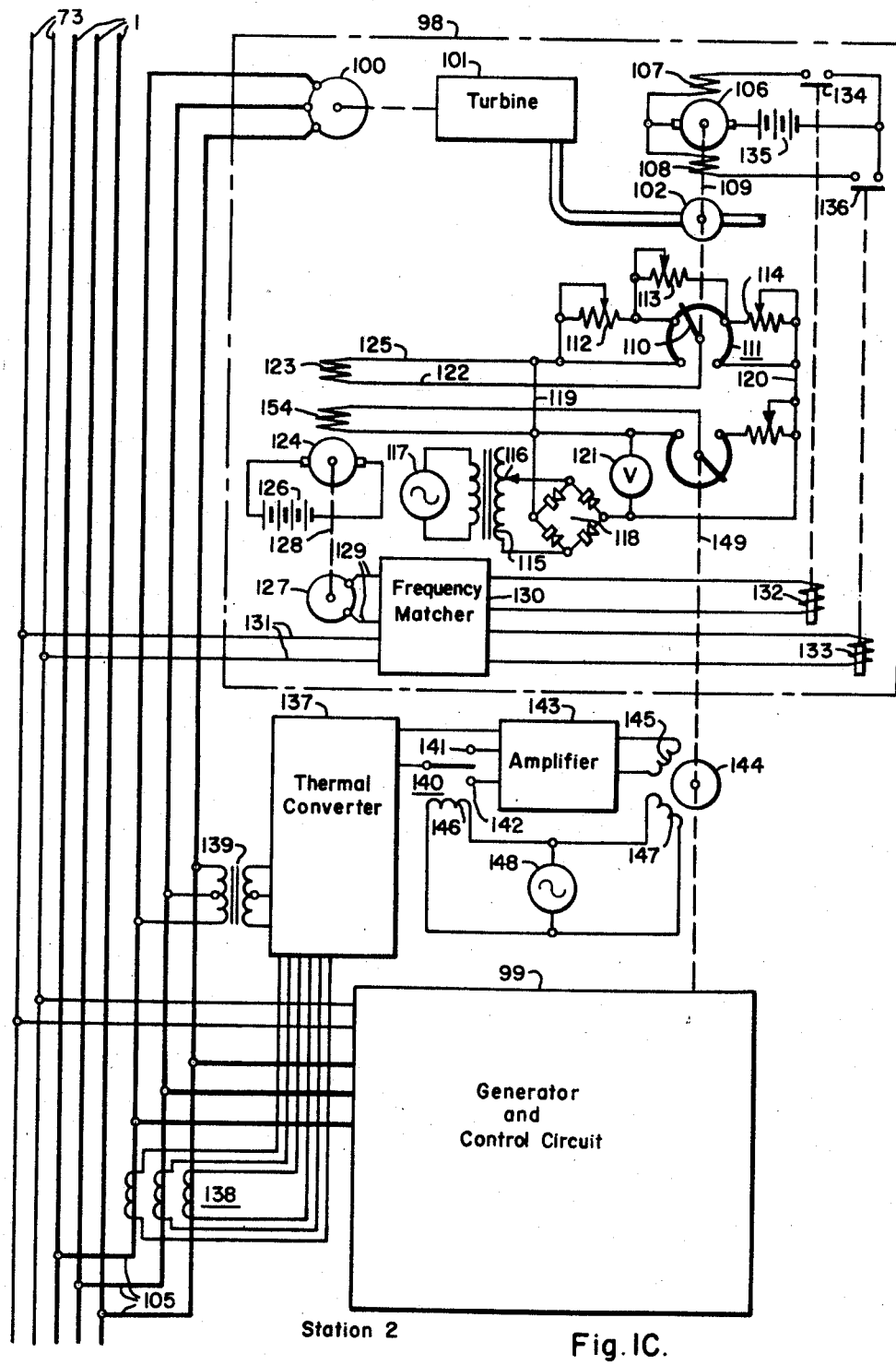

United States Patent Office 2,933,615
Patented Apr. 19, 1960

2,933,615

LOAD AND FREQUENCY CONTROL OF POWER GENERATING SYSTEMS

Myron J. Brown, Forest Hills, Pa., assignor to Westinghouse Electric Corporation, East Pittsburgh, Pa., a corporation of Pennsylvania Application May 7, 1958, Serial No. 733,761

9 Claims. (Cl. 307—57)

This invention relates to load and frequency control of a power generating system and more particularly to an auction system for the generators of a power system capable of dictating economic loading of each of the generators in the system.

It has generally been the practice in power generating systems to determine by the use of cost curves and efficiency curves as well as distribution system loss curves, the selection of the generators of a system capable of economically taking on additional load to be assumed by the system. This procedure has the disadvantage of requiring the dispatcher to use many curves in determining what stations are to take on additional loads in the system with the dispatcher necessarily anticipating the additional generation needed to carry the anticipated additional load.

It is therefore an object of the invention to provide a dispatching office control capable of sensing the needs of the system and providing an output request to each of the stations for additional generation.

It is another object of this invention to provide a generator power indication of the load carried by each generator in a station which is compared with the dispatcher request to determine the amount of additional generation to be supplied by the particular station and its generators.

It is another object of this invention to provide a telecontrol or load change system requirement indication frequency from the dispatching office of the system established by the load conditions of the system.

It is another object of this invention to provide a generator loading indication frequency and comparison circuit for determining the amount of additional load to be taken by the generator or to be shed by the generator if the generator frequency is above the dispatcher telecontrol frequency.

It is another object of this invention to provide a control for the generator loading indication frequency capable of simulating approximate transmission losses between the station and generator and the load center of the system.

It is another object of this invention to provide the generator loading indication frequency in accordance with the fuel costs and costs of generation of the particular generator associated therewith.

Other objects, purposes and characteristic features will become obvious as the description of the invention progresses.

In practicing this invention, there is provided a dispatching office capable of generating a telecontrol frequency indicative of deviation from schedule of the power being supplied or received over a tie-line circuit and the power requirements reflected in changes in system frequency dictated by the loading of the particular system involved. The output frequency from the dispatching office is then delivered to each of the generators of each station in the system. Each generator of the system is provided with a frequency generating circuit responsive to the position of the steam valve or governor controlling the particular generator prime mover or turbine. This frequency is then modified by the transmission losses known to exist between the generating station and the load center of the system resulting in a composite frequency that is compared against the incoming dispatcher's office frequency to determine whether the generator is to assume additional load or shed some of the existing load. Any adjustment of the loading of the generator of each station results in a change in the dispatcher office system requirement telecontrol frequency as well as adjustment in the loading indication frequency established by the particular generator. The telecontrol frequency established by the dispatcher's office will continue to be modified as each generator assumes its share of the load in accordance with its cost of generation until the entire system requirement is satisfied.

Figure 1B:
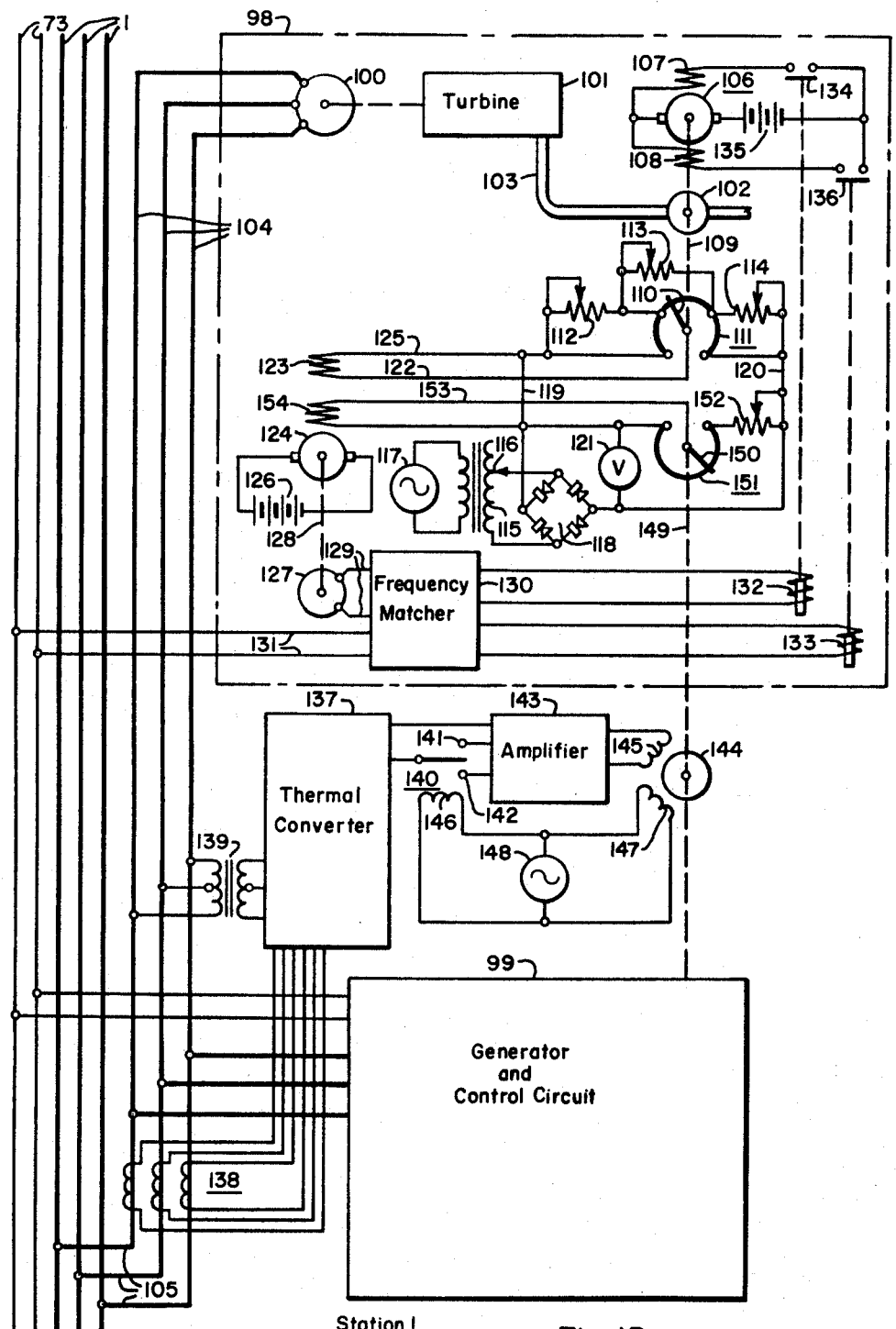

Figure 1A is a view of a typical dispatcher office sensing and frequency generating circuit; and Figs. 1B and 1C are diagrammatic views of two generating stations involving two generators in each station.

In each of several views, similar parts bear like reference characters.

The diagrammatic view shown in Fig. 1A represents a typical dispatching office provided with a system power three-phase line 1 provided with a three-phase tie-line 2 connected thereto and utilized to supply power to or receive power from an adjacent system in order to satisfy peak load demands within the system without requiring additional generating stations. In order to establish a bidding frequency with which to determine the loading to be assumed by each of the generators in the system, it is necessary to determine the amount of power being supplied to or received from the adjacent system over the tie-line 2. In order to accomplish this, a thermal converter 3 of any suitable commercial type is provided capable of measuring the current and voltage of the tie-line and in response thereto provide an output over the conductor 4 to an amplifier 5, of any suitable type. The output over the conductor 4 is in millivolts and is proportional to the wattage of the power being delivered over the tie-line conductors 2. The output of the amplifier 5 can therefore be above or below ground potential in order to determine whether the power is being supplied or received over the tie-line 2. This output appears on the conductor 6 and is fed into a summing circuit over the summing resistor 7. In addition to knowing the power supplied to or received from the tie-line 2, it is also necessary to determine the load conditions of the system for which the dispatcher's office is responsible. For this reason a transformer 8 having a primary winding 9 is connected to one of the phases of the system three-phase lines 1. The secondary 10 of the transformer 8 is connected over the conductors 11 and 12 to a frequency standard and error circuit generally designated by the reference 13. The conductor 11 is connected to a pair of variable inductances 14 and 15 which are connected in series with capacitors 16 and 17, respectively, which are in turn connected to an output circuit. Inductance 14 and capacitance 16 are connected through oppositely poled rectifiers 18 and 19 and resistors 20 and 21, respectively, to opposite error output terminals 22 and 23, respectively. The series connected inductance 15 and capacitance 17 are connected through oppositely poled rectifiers 24 and 25 and resistances 26 and 27, respectively, to the output terminals 22 and 23, respectively. The output terminals 22 and 23 are connected through load resistors 28 and 29 respectively to the other conductor 12 connected to the secondary 10 of the transformer 8. Connected across the secondary 10 of the transformer 8 is a voltage regulating device VR of any suitable type capable of maintaining a constant voltage output. The inductances 14 and 15 are therefore adjusted to establish a standard frequency response when associated with the capacitors 16 and 17 with the voltage sample being taken from the supply conductors 1 over the transformer 8 being applied to the standard frequency elements 14 through 17. Any deviation in frequency in the voltage appearing across the conductors 11 and 12 would, therefore, result in an error signal appearing across the output terminals 22 and 23 when the frequency of the main power line conductors 1 is compared to the standard established by the elements 14 through 17. A further explanation of the response of the frequency reference circuit 13 can be found in the application Serial No. 518,900 entitled "Alternating Current Responsive Devices," filed June 29, 1955, by inventor Uel L. Smith, and assigned to the common assignee.

If the frequency sampled by the transformer 8 and fed into the frequency comparison circuit 13 has deviated from the standard frequency, as would occur in response to increasing or shedding load, a deviation or error signal will be immediately available on the terminals 22 and 23 which is then fed through the potentiometer 31, adjusted to set the sensitivity level of the frequency response, whose adjustable arm 32 provides an output on the conductor 33 connected to the summing resistor 34 which is connected in parallel with the summing resistor 7 of the tie-line control previously described. This circuit allows immediate and rapid adjustment of the telecontrol frequency to the generating stations in response to sudden load changes.

It is also necessary to provide a circuit capable of integrating or averaging the frequency deviations felt by the system conductors 1 and by comparing this frequency with a standard frequency, established by a suitable oscillator 35 provide a correction signal readjusting the frequency. The standard oscillator 35 controls a standard time synchronous clock motor 36 which is connected through a differential gearing 37 to an output shaft 38. Also connected to the differential gearing 37 is another synchronous system time clock 39 connected to the secondary 10 of the transformer 8 which is in turn connected to the system power conductors 1. It can be seen, therefore, that with the synchronous clock 36 operating in response to the standard oscillator 35, and with the synchronous clock 39 operating in response to the actual frequency appearing on the conductors 1, the shaft 38 leading from the differential gearing 37 connected to the clocks 36 and 39 will actually indicate a change in frequency, needed to place the system back on proper frequency in response to long time changes occurring in the system. The output of the shaft 38 is therefore connected to the sweeping arm 40 of a suitable potentiometer 41 which is center tapped and grounded at the center tap at the point 42 in order to provide an increase or decrease in frequency depending upon whether the sweeping arm 40 is to one side or the other of ground. The potentiometer 41 is energized by suitable direct current source 43 connected across its ends. The sweeping arm 40 is then connected through a summing resistor 44 connected in parallel with the summing resistors 7 and 34 described hereinbefore.

Although it may not be necessary, it is desirable to provide a manual control such as the manual control 45 capable of providing an anticipation of additional load in order to maintain a minimum system load requirement during low load periods or in anticipation of changes in the system loads. The manual control 45 has connected thereto a variable arm 46 of a suitable potentiometer 47. The potentiometer 47 is energized by a suitable direct current source 48 connected across its ends and is grounded at a center tap 49 to establish an increase and decrease of loads by the manual sweep arm 46. The sweep arm 46 is then connected through a summing resistor 50 connected in parallel with the previously mentioned summing resistors 7, 34 and 44, all of which are connected to a common point 51 connected to a voltage developing resistor 52 which is in turn connected to ground.

The summing network established by the resistors 7, 34, 44, 50 and 52 therefore develops a voltage that is a combined voltage of the tie-line deviation from schedule, the instantaneous change in system frequency and the integrated deviation of the frequency as well as the manual prescribed change of power, with this voltage then being applied to the movable member 53 of a suitable chopper or vibrator (of any well-known type) 54.

The vibrating contact 53 of the vibrator is provided with an energizing coil 55 connected to a suitable alternating current source 56. The vibrating contact is provided with two fixed contacts 57 and 58 between which it moves at the frequency established by the alternating current source 56. It can be seen, therefore, that the output from the summing resistors connected to the movable contact 53 is alternately applied to the fixed contacts 57 and 58 which are, in turn, connected to the amplifier 59 capable of providing an output on a field winding 60 associated with a two-phase motor 61. The second field winding 62 of the two-phase motor is connected to the reference source 56 to provide a reference field with which the control field winding 60 can cause the motor 61 to rotate in either direction. The output of the motor 61 is delivered over a shaft 63 to a movable arm 64 of a suitable potentiometer 65 having a battery 66 connected across the ends thereof. The movable arm is connected to the amplifier 59 by the conductor 67 forming a suitable feedback into the amplifier 59 that is directly proportional to the position of the armature of the motor 61. The potentiometer 65 is grounded at the terminal 68 midway between its ends to provide an appropriate feedback above or below ground potential. Also connected to the shaft 63 is a suitable controller shown in this case to be a drum controller 69, however, any other suitable control such as cams and switches could be used. The drum controller 69 is used to control the speed of a direct current motor 70 used to drive a suitable alternator 71 to produce a telecontrol frequency on the conductor 72 connected to the telecontrol line comprising the conductors 73.

Since it is desired to be able to raise or lower the frequency of the alternator 71 at a fast or slow rate, the excitation of the motor field 74 associated with the direct current motor 70 is arranged to be excited through two different control circuits.

The first circuit for very rapid acceleration or deceleration of the drive motor 70 and alternator 71 comprises a pair of resistances 75 and 76 connected in series with the shunt field 74 with a variable rheostat 77 suitably driven by a control motor 78 for slow motor speed control to be explained hereinafter. To provide normal motor field excitation of the field 74 allowing both increase and decrease possibilities of the alternator 71, it is necessary to shunt the resistor 76 in series with the motor field 74 through the use of the contact strip 79 bridging the contact points 80 and 81 connected to the conductors 82 and 83 respectively. The conductors 82 and 83 are in turn connected to points on opposite ends of the resistor 76 so that with the contact strip 79 in three of the four positions shown in the drum controller, these contacts are completed and the resistance 76 shunted. In order to get a rapid rise in the output of the alternator 71, the drum controller 69 is moved to the right as shown in the drawings until the contact strip 79 has moved clear of the contact points 80 and 81. At this time, the resistor 76 becomes inserted into the circuit of the motor field 74, lowering the field excitation established by the field 74 and causing an increase in the r.p.m. of motor 70. Since the values of the resistances 75 and 76 are quite high, this is a rapid increase in the r.p.m. of motor 70. If the drum controller is moved back to the left to the rapid lower position indicated on the drawing as LL, it can be seen that the resistance 76 again becomes shunted, increasing the excitation of the field 74 and lowering the output produced by the alternator 71. With the drum controller moved fully to the left, as viewed in the drawings, to the lower LL position indicated, it can be seen that the contact point 84 also engages the contact strip 79, causing the resistor 75 to also become shunted, resulting in a still greater energization of the shunt field 74 causing the motor 70 to further decrease its R.P.M. and the alternator 71 to lower its telecontrol frequency. The two conditions just described are those of the extreme raise RR and extreme lower LL conditions which initiate very large frequency chages in the output of the alternator 71. It is desirable, however, to provide a means for causing a gradual change in the speed of the motor 70 through the control of its field 74. For this condition the contact strips 85 and 86 secured to the drum controller 69, are provided. If we again look at the drum controller 69 and assume the drum controller being moved to the right as viewed in the drawings toward the raised position R, it can be seen that the contact strip 85 completes the circuit between the contact points 87 and 88, causing energization of the control motor 78 by completing a circuit that can be traced from the contact point 88 through the battery 89, the armature 90, the field winding 91 for the raised direction to the contact point 87. The armature then moves in one direction, driving its output shaft 92 connected to a speed reduction gear train 93 provided with an output shaft 94 connected to a sweep arm 95 on a rheostat 77. Movement of the drum controller 69 to the right completing the contact points 87 and 88 with the strip 85 causes the motor 90 to rotate in a direction capable of driving the arm 95 in a clockwise direction causing an increase in resistance in series with the field 74. This in turn reduces the excitation for the motor 70 causing a slight increase in the telecontrol frequency delivered by the alternator 71.

If we now assume that the drum controller 69 is moved to the left as viewed in the drawings causing the lower L contact strip 86 to engage the contact points 88 and 96, a circuit is completed for the control motor 78 to cause it to reverse its direction of rotation. The circuit can be traced from the contact point 88 through battery 89, the armature 90, the field winding 97 to the contact point 96. The motor 78 then reverses its rotation, causing the gear train 93 to rotate the movable arm 95 in a counter-clockwise direction causing a decrease in the series resistance of the shunt field 74 increasing the excitation of the motor 70 and thus decreasing its r.p.m. and the telecontrol frequency of the alternator 71. The telecontrol frequency applied to the conductor 73 is then supplied to each and every generator in the system being controlled by this dispatching office.

It will be seen from above that the frequency of generator 71 will increase or decrease until the error stimulating its change, as sensed by shaft 63, disappears.

Referring now to Fig. 1B, there is shown a typical station comprising two generators and generator control systems 98 and 99. The generator and its control system 98 is shown in detail and since the generator system 99 is identical with the generator system 98, this generator is shown in block diagram form.

The generator control system 98 comprises a generator or alternator 100 driven by a suitable steam turbine 101 controlled by a steam valve 102 which in turn controls the steam being delivered through the pipe 103. The generator 100 is connected to suitable station bus bars 104 which are in turn connected to the main system conductors 1 over the conductors 105.

Since it is the incoming frequency provided by the bidding line 73 to each of the generator control systems 98 and 99 of station 1 that determines the output of its generators, it can be seen that it is necessary to provide a frequency generating device controlled by the output of each generator in order to provide a satisfactory indication of the output of the generator as compared to the bidding frequency supplied over the conductors 73. For this reason the steam valve 102 for the turbine 101 driving the generator 100 is provided with a governor control, simply shown here as a control drive motor 106 provided with a pair of series fields 107 and 108 capable of providing a reversal operation of the motor 106. Any suitable well known type of commercially available governor may be used. The motor 106 is then mechanically connected through the connection 109 to the steam valve 102 and to the sweep arm 110 of a suitable potentiometer 111.

The potentiometer 111 is provided with a plurality of parallel connected resistors 112, 113 and 114 capable of providing a non-linear characteristic for the potentiometer 111 through the entire sweep of the movable arm 110. Each of the parallel resistors 112, 113 and 114 is provided with a variable tap capable of providing necessary adjustments for the non-linear characteristic of the potentiometer for proper generator control. The non-linear potentiometer or tapered potentiometer through the resistances 112, 113 and 114 establishes a proper incremental cost curve of the turbine and generator 101 and 100, respectively, in station 1.

In order to provide proper control characteristics as a result of the tapered potentiometer, it is necessary to energize this potentiometer by a voltage that is proportional to the cost of the fuel consumed by the turbine driving the generator 100. This fuel cost is provided through the use of a variable brush tap transformer 115 having a variable tap 116 capable of being positioned in proporton to the cost of fuel. The variable brush transformer 115 is energized from a suitable source of alternating current power 117 and is provided with a full-wave rectifier 118 connected to the variable tap 116 for the purpose of providing a direct current voltage across the conductors 119 and 120 connected across the non-linear or tapered potentiometer 111. It can be seen, therefore, that adjustment of the variable brush transformer establishes a voltage representative of the cost of fuel which is connected across the potentiometer 111 capable of providing the incremental cost curve for the generator and turbine unit 100 and 101. In order to determine the fuel cost voltage, a voltmeter 121 is placed across the output conductors of the full-wave rectifier 118 which may be calibrated in fuel cost increments as desired.

The movable arm 110 of the incremental cost potentiometer 111 energized by the fuel cost voltage setting of variable brush transformer 115 is then connected through the conductor 122 to the control winding 123 of a suitable D.C. motor 124. The remaining terminal of the control winding 123 is then connected through the conductor 125 to one side of the potentiometer 111 in order that the movement of the arm 110 can vary the excitation of the field winding 123 in response to fuel costs and incremental costs established by the variable brush transformer 115 and the potentiometer 111, respectively.

The motor 124 is provided with a direct current source of power 126 connected across its armature providing suitable energy for the armature to react with the excitation provided by the control field coil 123. The output of the motor 124 is then connected to the alternator 127 through the mechanical connection 128 to cause the alternator 127 to produce an output frequency on its conductors 129 which is fed into a frequency matching circuit 130 of any suitable well known commercial type. The frequency matching circuit also has the bidding frequency from the conductor 73 fed into it by the conductors 131. The two frequencies are therefore compared within the frequency matching circuit resulting in either a raise or a lower control introduced to the relays 132 or 133 respectively, depending upon whether the incoming frequency on the conductors 131 is above or below the frequency on the conductors 129 provided by the alternator 127. If we assume for the moment that the frequency matcher provides energy to the raise relay 132, it can be seen that its armature would be moved to close the contact 134, completing the control circuit for the motor 106 through its field winding 107 and a suitable D.C. source of power 135. This causes the motor 106 to rotate in a direction capable of increasing the supply of fuel or steam through the conduit 103 to the turbine 101, thus causing the generator 100 to assume a greater output.

If the frequency supplied by the bidding conductor 73 is below the frequency supplied by the alternator 127, the relay 133 then becomes energized, causing its contact 136 to be closed, completing a reverse circuit for the motor 106 through the series field 108, the armature of the motor 106, the direct current source 135 and the contact 136 of the relay 133. Since the relay 133 is energized at this time, it should be understood that the relay 132 also becomes deenergized at this time, interrupting the previously recited circuit for the motor 106. Reversal of the motor 106 moves the valve 102 to a position reducing steam being delivered to the turbine 101 and at the same time moves the potentiometer 111 in a direction increasing the excitation of the field 123, causing a reduction in the frequency delivered by the alternator 127 to the frequency matching circuit 130. When the frequencies are again matched, both relays 132 and 133 become deenergized, holding the prime mover 101 speed constant.

Since it is necessary to consider transmission losses between this station or this generator and the load center of the system, a circuit is provided for varying the output frequency of the alternator 127 in response to the distance as well as the total power being delivered by the station to the load center. Since it would be necessary to provide a complex computer to determine the exact transmission loss to be encountered by the power being delivered from station 1, and since the computer might be prohibitive in cost, an approximate transmission loss control is provided in this system. Since it is the combined power being delivered by this station including both generator systems 98 and 99 to the system bus bars 1, it is necessary to sample the output on the station bus bars in order to determine most accurately the transmission loss. For this reason, a thermal converter 137 is provided having current transformer 138 connected to the station output conductors 105 and a voltage transformer 139 connected to the station bus bars 104 also connected to the thermal converter 137. The output of the thermal converter is then fed through a suitable chopper or vibrator 140 which alternately applies the power to the contact points 141 and 142 on the input to a suitable amplifier 143 used to control a two-phase motor 144. The output of the amplifier 143 is connected to the control winding 145 of the two-phase motor 144 with the coil 146 of the vibrator 140 and the second winding 147 of the two-phase motor each being connected to a suitable reference source of alternating current 148. This means that the two-phase motor 144 is driven to a position corresponding to the relative amount of power being supplied by the stations to the system conductors 1. The armature of the two-phase motor 144 is then connected through a suitable mechanical linkage 149 to the movable member 150 of the suitable potentiometer 151. The potentiometer 151 is connected through a variable resistor 152 to a full-wave rectifier 118 in order to provide energy across the potentiometer 151 that is proportional to the fuel costs of the fuel being delivered to the generator turbine 101. The movable arm 150 is connected through a conductor 153 to a differential field 154 associated with the drive motor 124 for the alternator 127. The remaining terminal of the differential field is then connected to the opposite output terminal of the full-wave rectifier 118. It can be seen, therefore, that the differential field excitation is varied directly in proportion to the fuel costs and also varied directly to the amount of power being delivered through the station output conductors 105. This means that with greater power being delivered through the station bus bars 105, the excitation of the differential field is increased, causing a decrease in the total excitation for the motor 124 resulting in an increase in its r.p.m. and in the frequency being delivered by the alternator 127. This increase in frequency therefore means that the bidding frequency must be higher by an amount equal to the approximate transmission losses in order for this generator 100 to increase its power output.

The shaft 149 associated with the station transmission loss drive motor 144 is also continued into the control system for the generator system 99 which is controlled identical with the control system described in connection with the generator system 98. A detailed explanation of this system therefore will not be given.

Station 2 shown in Fig. 1C is identical with station 1 as shown and therefore will not be described in detail, but will bear identical reference characters to those parts shown and described in station 1. It is pointed out, however, that the output supplied by station 2 to the system might be quite different than that supplied by station 1 if the cost of fuel and the efficiency of operation of the generators in station 2 is different from station 1.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator.

2. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, said sensing means comprising a system frequency error detecting means for providing instantaneous frequency change in said control system change requirement frequency signal generating means.

3. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, said sensing means comprising a system frequency error detecting means for providing instantaneous frequency change in said control system change requirement frequency signal generating means, and system frequency change integration means for controlling said control system change requirement signal generating means to provide an additional signal change in response to the system frequency deviation over a period of time.

4. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, said sensing means comprising a system frequency error detecting means for providing instantaneous frequency change in said control system change requirement frequency signal generating means, and system frequency change integration means for controlling said control system change requirement signal generating means to provide an additional signal change in response to the system frequency deviation over a period of time, and manual control means in said sensing means for providing a manually controlled signal for predictable load changes.

5. A load and frequency control circuit for a power generating system comprising sensing means for determining total generation requirement for said system, control system change requirement frequency signal generating means connecting to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, fuel cost adjusting means in said loading indication signal means for controlling each said loading indication signal means in proportion to fuel costs.

6. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, each said loading indication frequency signal means comprising a transmission loss control means.

7. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, each said loading indication frequency signal means comprising a transmission loss control means, each said transmission loss control means comprising a potentiometer and detector drive means connected to each said loading indication frequency signal means for reducing each said frequency signal means in proportion to the power supplied to the system by the generators of the associated station.

8. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, each said loading indication frequency signal means comprising a transmission loss control means, each said transmission loss control means comprising a potentiometer and detector drive means connected to each said loading indication frequency signal means for reducing each said frequency signal means in proportion to the power supplied to the system by the generators of the associated station, said potentiometer detector drive means comprising a reversible motor connected for control by a station power output detecting means.

9. A load and frequency control circuit for a power generating system comprising sensing means for determining total generation requirement for said system, control system change requirement frequency signal generating means connected to said sensing means to produce a system change requirement control frequency that is proportional to said sensing means determined total generation requirement, a plurality of generators grouped in station groups in said system, drive and control means for each generator, loading indication frequency signal means for each generator responsive to the loading presently assumed by each said generator, signal comparator means for each said generator for receiving said system change requirement control frequency signal and its associated said loading indication frequency signal for producing an error signal for control input to said drive and control means of its associated generator, said sensing means comprising a system frequency error detecting means for providing instantaneous frequency change in said control system change requirement frequency signal generating means, and system frequency change integration means for controlling said control system change requirement signal generating means to provide an additional signal change in response to the system fre-quency deviation over a period of time, said frequency change integration means comprising a standard frequency source for reference comparison with said system frequency.

References Cited in the file of this patent

UNITED STATES PATENTS

| | | |
|---|---|---|
| 2,694,780 | Pattison et al. | Nov. 16, 1954 |
| 2,754,429 | Phillips | July 10, 1956 |
| 2,831,125 | Cohn | Apr. 15, 1958 |